United States Patent [19]

Grace et al.

[11] 4,097,695
[45] Jun. 27, 1978

[54] ASYNCHRONOUS ADDRESSABLE MULTIPLEX SYSTEM

[76] Inventors: Alan G. V. Grace, 11 Bay View Dr., San Carlos, Calif. 94070; Janet C. Wong, 123 Flying Mist Isle, Foster City, Calif. 94404

[21] Appl. No.: 814,677

[22] Filed: Jul. 11, 1977

[51] Int. Cl.$^2$ .............................................. H04J 6/00
[52] U.S. Cl. .................................. 179/15 BA; 178/50
[58] Field of Search ......... 179/15 BA, 15 BS, 15 AE, 179/15 AL, 15 A; 178/50

[56] References Cited

U.S. PATENT DOCUMENTS

| | | | |
|---|---|---|---|
| 3,804,986 | 4/1974 | Wakamatsu | 179/15 A |
| 4,000,378 | 12/1976 | Caplan | 179/15 AL |

Primary Examiner—David L. Stewart
Attorney, Agent, or Firm—Allan R. Fowler

[57] ABSTRACT

An asynchronous, addressable multiplex system comprises a master station in parallel communication with a number of slave stations. Both the master and slave stations employ independently clocked UAR/T's (universal asynchronous receiver/transmitter) circuits for simultaneous data receiving and transmitting, the UAR/T's communicating directly with one another. The master station includes means for formatting data to be transmitted by its UAR/T into message blocks each several bytes long and intended for a particular slave station whose address is encoded only in the first byte of the block. The message blocks are transmitted separated from one another by gaps which are two bytes long. Each slave station receives all master station message blocks and has means for recognizing the gaps and for then comparing the address in the first byte thereafter with an assigned slave station address. If the addresses correspond, the entire message block is accepted by the slave station. Only in response to a message block being accepted, return message blocks are transmitted by the slave stations UAR/T's to the master station UAR/T, such transmission being limited to an interval defined by an accepted message block and the gap therefollowing, no other return message source identification being required by the master station.

8 Claims, 7 Drawing Figures

ASYNCHRONOUS ADDRESSABLE MULTIPLEX SYSTEM

The present invention relates generally to multiplexed telemetry systems, and more particularly to asynchronously clocked, addressable systems.

Essentially all modern, complex electronic and electronically controlled systems must provide communication among various functions or parts of the system, for example, among a master control station and a number of slave stations. By means of such intercommunication, the master station, acting on information received from the slave stations and perhaps from elsewhere typically provides information or instructions back to the slave stations.

In most complex telemetry systems, space, weight or cost considerations preclude individual communication channels or links between the master station and each slave station. Accordingly, modern telemetry systems are, as a rule, multiplexed; that is, some type of communication channel sharing is provided. Usually a master station communicates in parallel with all of the slave stations so that all master station messages are directed to all of the slave stations. Because of such communication channel sharing, the multiplexing system must enable each slave station to identify messages intended for it and, enable the master station to correctly determine the source of return messages from the slave stations.

Multiplexing systems have typically fallen into the broad categories of frequency division and time division. In frequencing division multiplexing, the slave stations are typically assigned different, non overlapping portions of the telemetry frequency spectrum, band pass filters being used to separate the data and identify the transmitting source. The more commonly used, time division multiplexing systems have been implemented in various ways, for example, by pulse amplitude modulation (PAM) in which the signal pulse amplitude, during an assigned time segment, represents the information conveyed. PAM signals can be used to amplitude or frequency modulate a carrier signal.

Other examples of time division multiplexing are pulse duration modulation (PDM) and pulse position modulation (PPM), information being conveyed in PDM systems by varying the width (duration) of a pulse, in accord with an incoming signal, between a minimum and a maximum value equal to the alloted time segment and in PPM systems by variably positioning constant width pulses within alloted time segments.

The most commonly used time division multiplexing however, employs pulse code modulation (PCM), data to be conveyed being converted into, and encoded as, a sequence of binary pulses within a allocated time segment. PCM, which can be conveyed by carrier amplitude, frequency shifting or phase shifting (AM, FS or PS), has an advantage of being compatible with other digital portions of the system, such as computers.

Digital telemetry systems, such as PCM, normally use at least one synchronous clock for the master and slave stations, a master station clock allocating messages, channels, and access time to the slave stations. Synchronous clock systems have, however, several disadvantages. Because, the time when information is to be accepted by any slave station is determined by counting clock pulses, any noise which adds to or substracts from the clock may cause information to be misdirected or misinterpreted. If independent (non-synchronous) clocking is used, frequency drift between the master and slave station clocks has a similar result unless additional clocking is provided to periodically restart or synchronize the pulse timing.

Furthermore, transmission of high frequency clock signals from the master station to remotely located slave stations present problems. For accuracy, the clock frequency must be a number of times greater than the data transmission (band) rate. Therefore, at practical band rates, clock pulse transmission typically requires coaxial lines which are more costly and heavier than normal information transmission lines; to remote locations, several microwave channels or special transmission lines may be required for clock pulse transmission. As a consequence, alternative shared channel telemetry systems have been proposed or developed. One type employs integrated circuits known as universal asynchronous receiver/transmitter (UAR/T's). These UAR/T circuit subsystems have simultaneous receiving and transmitting capability, provide for converting data words serially received into parallel data words out and for serially transmitting data words input to the UAR/T in parallel. Although timing clocks are necessary, clocks in UAR/T's master and slave stations are not required to be synchronous; thus independent clock generators can be used and no clock transmission is required.

Because master and slave station UAR/T's can directly two-way communicate, without necessity for, clock transmission, they are ideally suited for use with conventional communication links, including telephone lines. Such an application is discussed in the article "Communication Circuits: Putting Data on the Telephone Network" appearing in the June 5, 1973 issue of Electronic Design News (EDN) at pages 30–38.

By connecting a number of slave stations UAR/T's in parallel to a master station UAR/T, through common communication links, non-synchronous multiplex equivalent systems are provided. Communication by the master station with particular UAR/T slave stations is enabled by assigning each slave station a unique address and by including a slave station address in all data bytes transmitted by the master station. In a like manner, each data byte sent back from slave stations to the master station must contain the slave station address for source identification.

UAR/T's, however, format binary data bytes so each data word typically contains only eight bits of actual message data. Consequently use of any of these eight bits for address/identification reduces the amount of message that can be sent. For example, four of the eight data bits are required for binary address/ identifying if 9–16 slave stations are to be used, half of each byte being thereby unavailable for conveying message information. In these cases, and because useful messages must usually contain a full eight bits, means must be provided for storing and combining message portions of successive bytes.

In multiplex equivalent applications, much of the communication time between UAR/T's is thus wasted and a system with numerous commonly controlled slave stations is very time inefficient and the actual transfer rate of message information becomes very slow. In an extreme case, if 128–256 slave stations are needed, all the bytes would have to be allocated to address/ identification and no message information could be sent.

Because of such heretofore time inefficiency of UAR/T multiplexing of a number of slave stations to a master station, applicant's have invented means for data formatting and decoding enabling very time efficient multiplexing of numerous slave stations and provides extremely efficient use of UAR/T's in asynchronous, addressable multiplex systems.

An asynchronous, addressable multiplex system comprises a master station having means for formatting and transmitting a series of outgoing message blocks, each block containing a number of data bytes and a destination address formatted into only a byte at the beginning of the message blocks, and each block being followed by an intermessage block gap. A plurality of slave stations are connected in parallel with the master station, each having an assigned address and each including means for receiving the outgoing message blocks, means responsive to the intermessage block gaps for recognizing the destination address byte and means for decoding the destination address and accepting only those message blocks having a destination address corresponding to the assigned address.

At least some of the slave stations have means for formatting and automatically transmitting return, non-identified message blocks to the master station in response to an outgoing message block being accepted therefrom, transmitting of the return message block being completed before a next outgoing message block is transmitted by the master station. No other return message block source identification is required by the master station, which includes means for receiving the return message blocks.

More specifically, means are provided in the slave stations for initiating transmission of the return message blocks while a correctly addressed message block is being received and for completing the transmission before the end of the gap following the accepted message block.

Communication links are provided for enabling transmission of message blocks between the master and slave stations, at least one common channel linking the master station transmitting means to all of the slave station receiving means in parallel and the master station receiving means to all of the slave station transmitting means in parallel.

First timing means are provided in the master station to enable functioning thereof and second timing means are provided in each of the slave stations to enable functioning of the slave stations. The first and second timing means are independent of one another so that no clock is required to be transmitted between the master and slave stations.

By encoding slave station addresses only in the first byte of each message block and by providing a gap between message blocks, the slave stations, by recognizing the gaps and by knowing that a message block destination address is encoded in the next byte, can compare the destination address with an assigned address. If the addresses correspond, the entire message block is accepted, no further addressing being required. The gap at the end of the message block resets the addressing comparing means in preparation for comparing the destination address of the next message block. In this manner, efficient data transferring is enabled, since only the first byte of each master station message blocks must be dedicated to a destination address. The remaining message block bytes follow the first byte. No return message block bytes are dedicated for source identification since whenever the master station receives return message blocks, it knows the message blocks can originate only at that slave station being transmitted to:

The gap in transmitting master station data also enables data updating, intermessage block communication and general "housekeeping."

A better understanding of the present invention may be had from a consideration of the following detailed description, taken in conjunction with the accompanying drawing in which.

Figure 1:
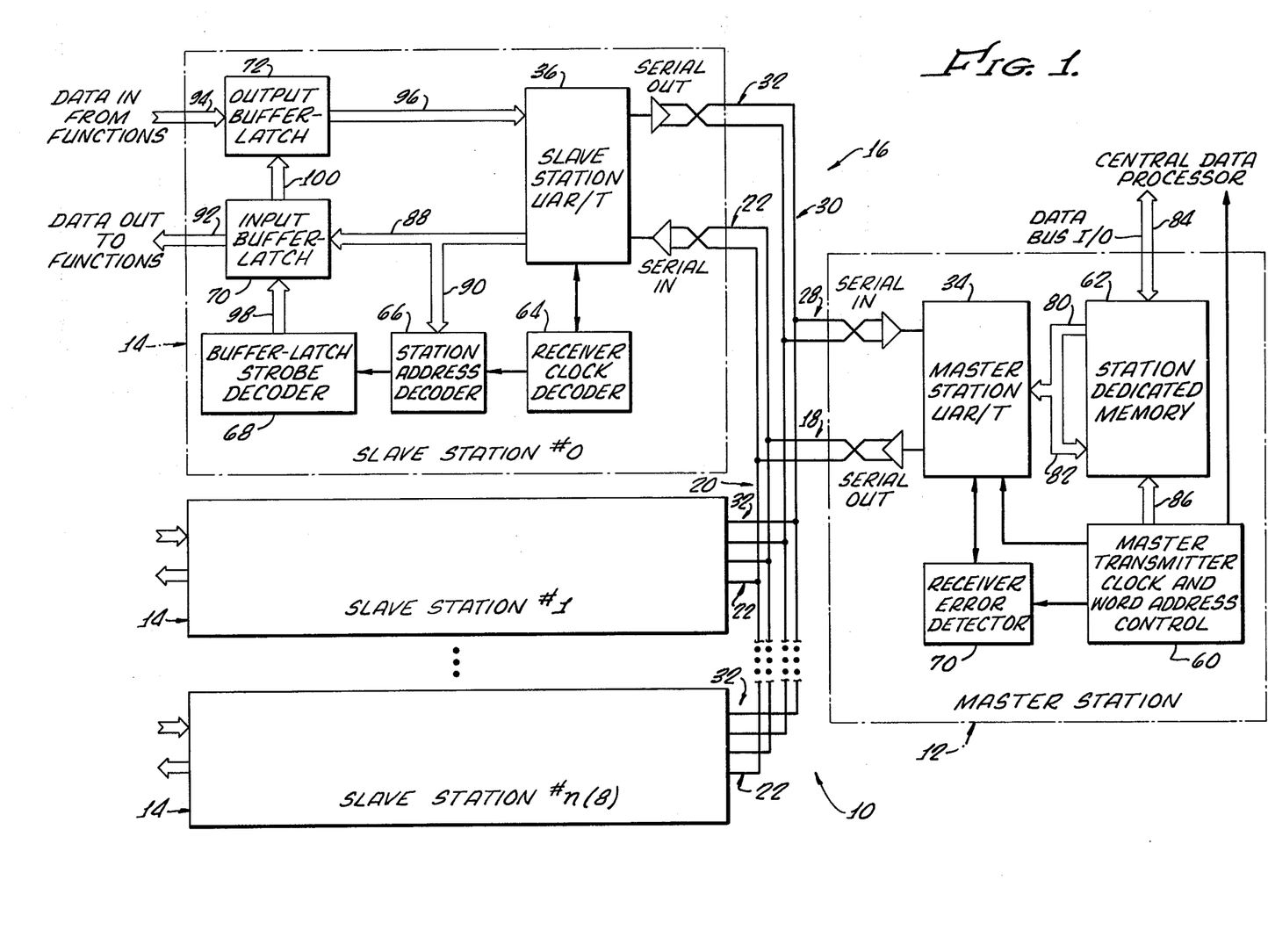
FIG. 1 is a general block diagram of the addressable nonsynchronous multiplexing system according to the preferred embodiment, showing a master station and a typical slave station.

In accordance with a preferred embodiment of the invention, an addressable, non-synchronous multiplex system 10 is depicted in general, functional block diagram form in FIG. 1. As shown, the multiplex system 10 comprises a master (controlling) station 12, a plurality or number "N" of slave (controlled) station 14 and communication link means 16 which interconnect the master and slave stations in parallel. Functional aspects of all the slave stations 14 are preferably substantially identical; therefore, only the first slave station, No. zero, is depicted and hereinafter described.

Data transmission from the master station 12 to the slave station 14, through the link means 16, is through a pair of master station output links 18, a first pair of common transmission links 20 and slave station input links 22 at each of the slave stations. In a similar manner, data is received by the master station 12 from the slave station 14 through a pair of master station input links 28, a second pair of common transmission links 30, and pairs of slave station output links 32.

The pairs of links 18, 20, 22, 28, 30 and 32 are to enable data transmission in conventional, differential format to maximize noise rejection. Single, rather than double, links may be used if less noise rejection is required. It is to be appreciated that although the link means 16 is shown in FIG. 1 and subsequent, as direct interconnections, other transmission links, such as microwave links, can be employed if necessary or more convenient, there being no limitation to hard wiring.

Direct data transmission between the master and slave stations 12 and 14 is enabled by universal asynchronous receiver/ transmitter (UAR/T's) in the stations: a UAR/T 34 in the master station and similar UAR/T's 36 in each of the slave stations. Although UAR/T's are commonly used and have been defined in manufacturer specification sheets as well as in articles such as "Using the UAR/T in Data Communications," published in a relatively recent application note (undated) by General Instrument Corp., Microelectronics Division, Hicksville, N.Y., and in the above cited EDN article, the multiplex system 10 can be better understood by briefly reviewing certain UAR/T characteristics, such as those of the General Instrument Corp. Type AY-5-1013A used for UAR/T's 34 and 36.

Such UAR/T's provide for simultaneous receiving and transmitting of digital data and provide serial to parallel and parallel to serial conversion so that data accepted in conventional parallel data bit format is transmitted in serial format. Likewise, data received in the receiver portion of the UAR/T in serial format is outputted in more useful parallel form. This serial data transmission between UAR/T's minimizes the required number of transmission links.

Another UAR/T feature is ability to communicate with one another without the necessity for sending clock pulses back and forth even though individual clocks having a 16 times band rate are required for UAR/T operation.

UAR/T's automatically format data to be transmitted into bytes 40 (FIG. 2), each byte 40 being 12 bits long and having a start zero bit 42, eight bits 44 for data, a parity one bit 46 and two stop bits 48 which are ones. Four of the bits are thus used for byte recognition, etc. as is more fully apparent from the ensueing description, leaving eight bits for actual data to be transmitted.

Figure 2:
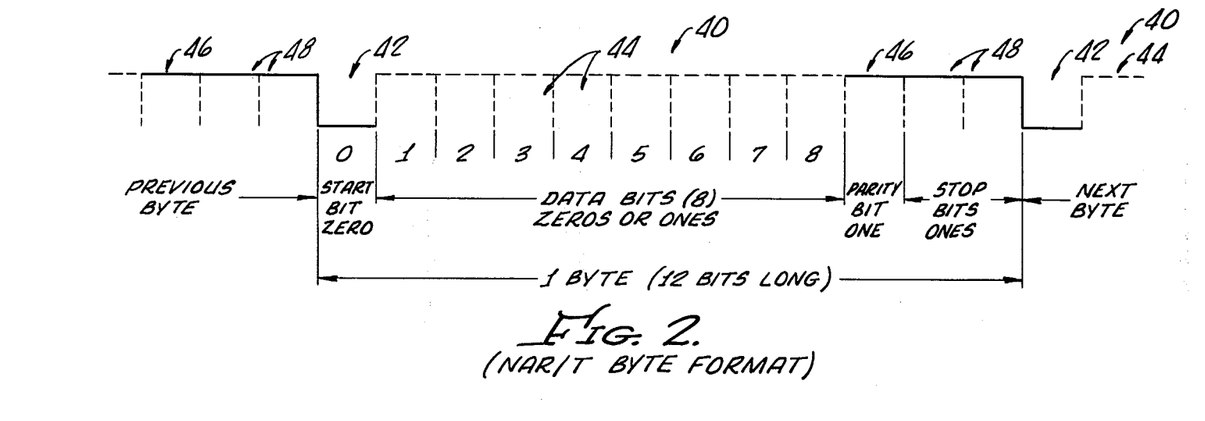
FIG. 2 is a schematic diagram showing formatting of data bytes by UAR/T's used in the master and slave stations.

Such fixed byte formatting by the UAR/T's is a substantial deficiency in multiplex systems which have no one-to-one UAR/T communication, all of the slave station UAR/T's receiving all the bytes 40 from the master station UAR/T 34. Each slave station UAR/T 36 must be able to recognize which of the bytes 40 are intended specifically for it and to accept only those bytes, and if the slave station UAR/T's 36 are to transmit data back to the master station UAR/T 34, the latter must be able to determine which slave station the data comes from.

Addressing of each of the bytes 40 is particularly inefficient when a number of bytes in sequence must be transmitted to each of the slave stations 14.

To enable efficient transmission of sequential data bytes 40 to a number of slave stations 14, the master station 12 includes means for formatting data transmitted by the master station UAR/T 34 into message blocks 50 (FIG. 3), each including the sequence of bytes 40 intended for each slave station 14. For purposes of this discussion, with no limitation intended or implied, each message block 50 is assumed to contain a sequence of 12 bytes 40 (bytes zero through 11).

Figure 3:
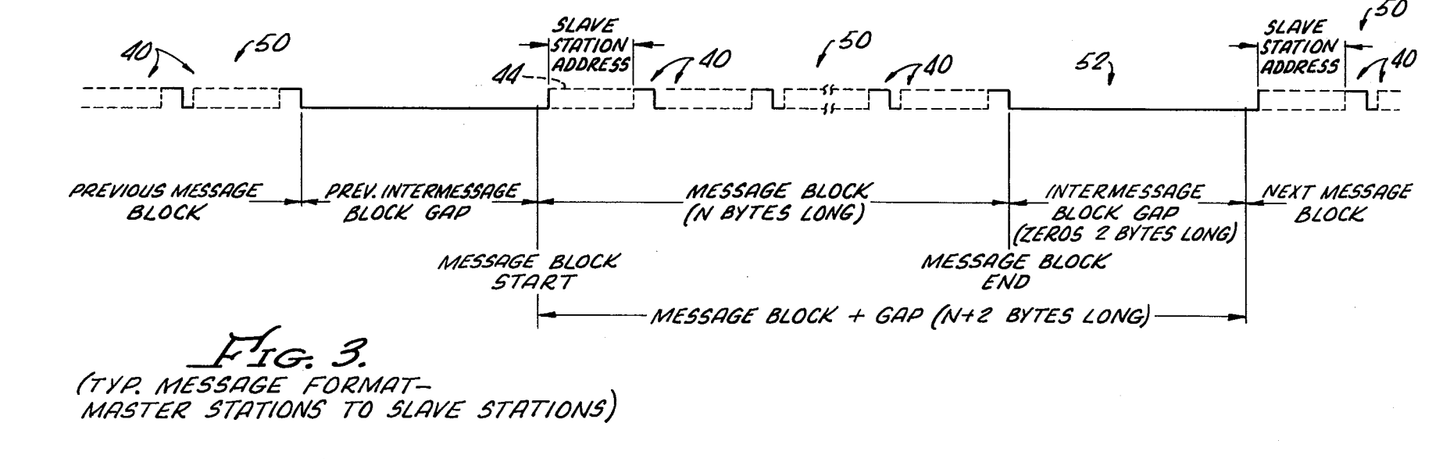
FIG. 3 is a schematic diagram showing formatting of plural byte message blocks and intermessage block gaps in the master station.

Preferably only the byte 40 (byte zero) of each message block 50, contains, or is allocated to, the intended slave station destination address. If necessary, however, due to relative lengths of the station address-for a large number of stations-and the bytes, additional bytes may be used to contain the single address, the remaining bytes in the block containing no address.

This master station outgoing message formatting is provided, as more fully described below, by a master transmitter clock and word address control 60 (FIG. 1) communicating with the master station UAR/T 34 and a station dedicated memory 62. Within each slave station 14, means are provided for recognizing the gaps 52, for comparing the station address in the first byte 40 thereafter (byte zero of the next message block 50) to an address assigned to the slave station, and for accepting only those correctly addressed message blocks. This is accomplished by a receiver clock decoder 64, a station address decoder 66 and a buffer - latch strobe decoder 68 which are connected to the slave station UAR/T 36 and an input buffer - latch 70.

When return data is to be transmitted from the slave station 14 to the master station 12, the decoders 64, 66 and 68 also control an output buffer - latch 72 so that return data is transmitted only during the interval of an accepted message block 50 and the gap 52 therefollowing. Only that slave station 14 actually accepting a correctly addressed message blocks 50 is enabled to transmit return data. This controlled return data transmission enables the master station 12, which knows, which slave station 14 is being transmitted to, to determine the source of return data. Return message receiving is also enabled, in part, by a receiver error detector 74 in the master station 12.

As is generally seen in FIG. 1, parallel data in the master station 12 flows from the memory 62 to the UAR/T 34 along a path 80 and from the UAR/T to such memory along a path 82. Parallel data flows into and out of the memory 62 from an external central processing unit (CPU) (not shown) along a path 84, control signals from the control 60 to the memory 62 pass along a path 86. In the slave station 14, parallel data is directed from the UAR/T 36 to the input buffer - latch 70 along a path 88, with a parallel path 90 to the station address decoder 66. From the input buffer - latch 70 data flows along a path 92 to external functions (not shown) such as lights or indicators. In a reverse manner, data to be transmitted flows from the external functions to the output buffer - latch 72 along a path 94, and thence along a path 96 to the UAR/T 36. Control of the input and output buffer latches 70 and 72 from the buffer - latch strobe decoder 68 is along paths 98 and 100 respectively.

Description of the Master Station 12

Figure 4:
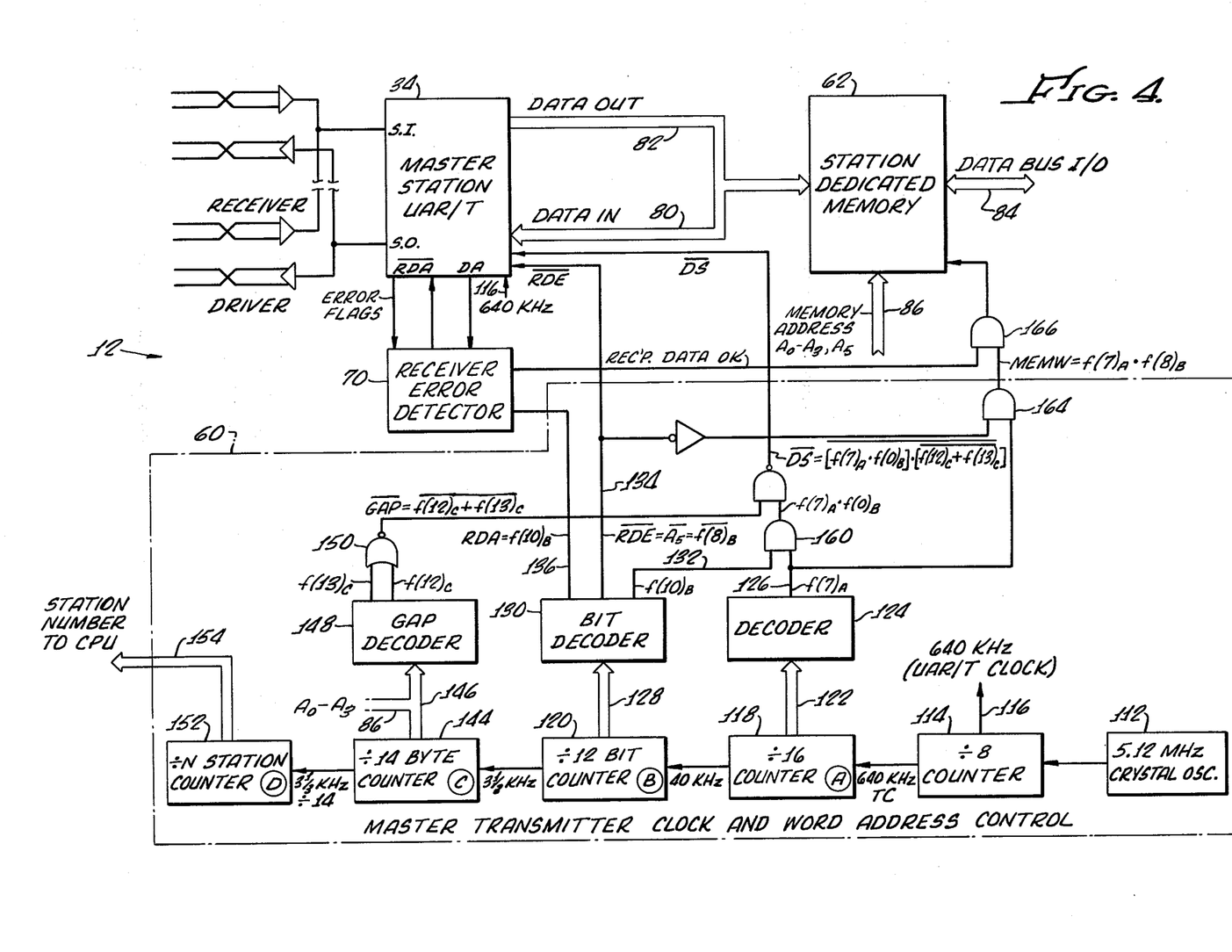
FIG. 4 is a block diagram of the master station of FIG. 1, showing features thereof.
Figure 5:
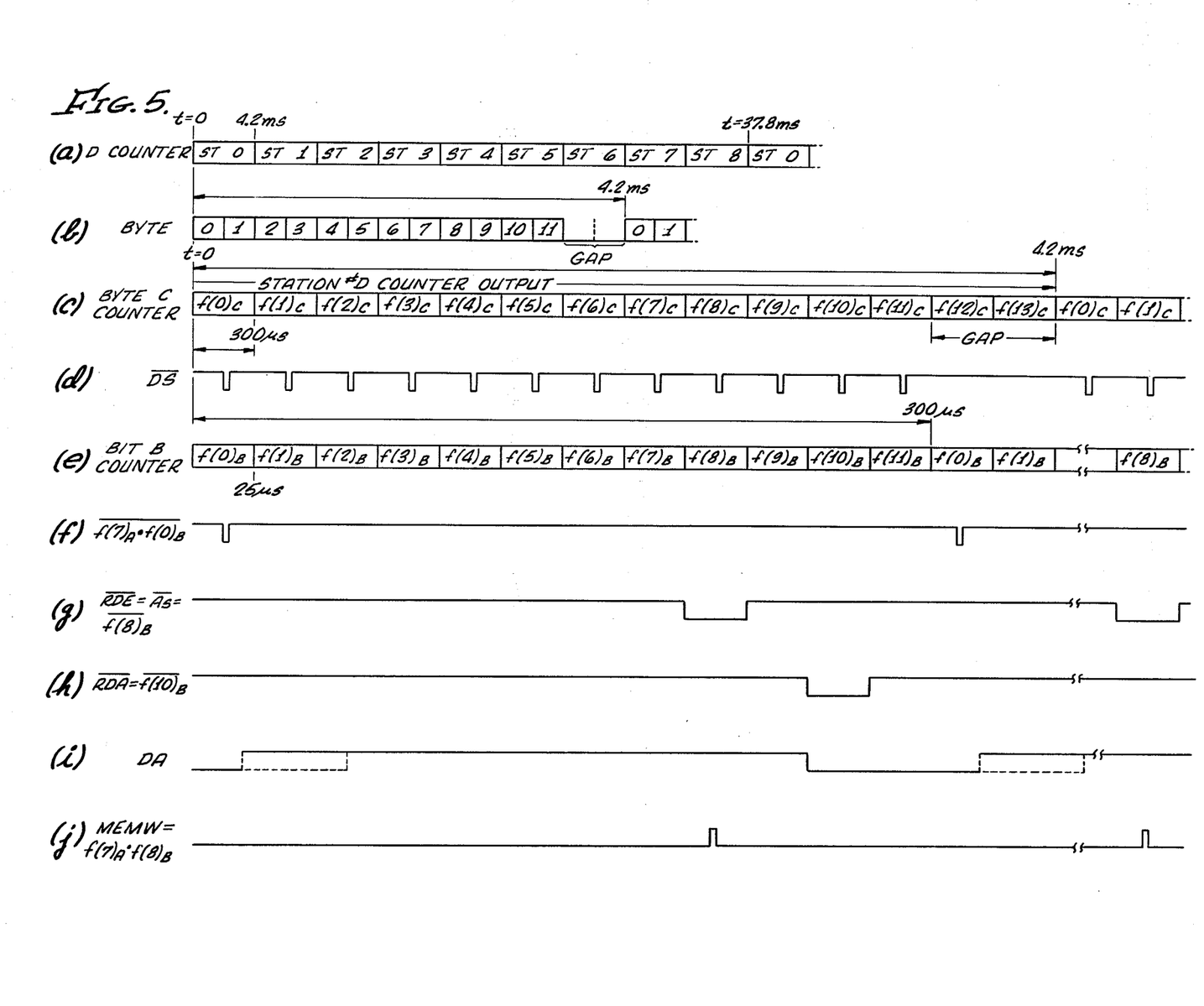
FIG. 5 (comprised of FIGS. 5a-j) is a timing diagram associated with the master station block diagram of FIG. 4, showing various input/output characteristics of blocks thereof.

A better understanding of the master station 12 can be obtained from considering FIG. 4 which provides a further breakdown of the master station counter 60 into functional block diagram form and FIG. 5 which provides an associated signal and timing diagram associated with various parts of the master station 12 and thus provides functional block input/output characteristics.

As above stated the counter 60 functions to format message blocks 50 (FIG. 3) for each of the slave stations 14, each of the blocks comprising, as an illustration, a sequence of 12 bytes 40 (FIG. 2) each having 12 bits, as determined by the UAR/T 34. The blocks 50 are formatted having a destination address encoded in the data bits 44 of only byte zero; each block is followed by a two byte long gap 52. Also for illustrative purposes nine slave stations 14 (zero through eight) are assumed. A message cycle 110 accordingly comprises a sequence of nine blocks 50, each of the slave stations being addressed in sequence. Furthermore, again for illustrative purposes, a baud rate of 40,000 is assumed; that is, the UAR/T 34 transmits and receives data bits at a 40 KHz rate. At this frequency an entire message cycle 110 (diagram 5(a), FIG. 5) is 37.8 msec long, a message block 50 plus gap 52 is 4.2 msec long (diagram 5(b) and 5(c)), a byte 40 is 300 msec long (diagram 5(d)) and a bit is 25 msec long (diagram 5(d)). To enable the 40,000 band rate, a 16 times baud rate clock of 640 KHz is provided, as described below.

A conventional crystal oscillator 112 (FIG. 4) supplies a 5.12 MHz clock which is divided by a "divide by" 8 counter 114 to provide the requisite 640 KHz clock for the UAR/T 34, to which such counter is connected by line 116. Another 640 KHz output of the counter 114 is fed to a "divide by" 16 counter, or counter A; 118 which provides a 40 KHz output to a "divide by" 12 counter, counter B, 120 which functions as a bit counter. A binary coded decimal (BCD) output of the counter A 118 is fed along a path 122 to a decoder 124 having outputs corresponding to the 16 divisions of the 640 KHz. Stated otherwise, the counter A 118 continuously counts 16 of the 640 KHz pulses before putting out a clock pulse to the counter B 120. Each of these 16 pulses is continuously counted binarily and the count fed to the decoder 124, from which any desired one of the 16 clock pulse counts can be extracted. As shown, and for purposes to become clearer, a seventh pulse count, referred to as $f(7)_A$, is selected; for each count to 16, to divide down the 640 KHz clock to 40 KHz, a pulse is obtained on an output line 126 at the seventh count and hence near the center of each bit.

In a similar manner, a binary count of 0-11 is provided along a path 128 from the bit counter B 120 to a bit decoder 130. Again for reasons to become more apparent, a zeroth bit count pulse, $f(o)_B$ is obtained on an output line 132, an inverted eighth bit count pulse, $\overline{f(8)}_B$, (diagram 5(f) on a line 134 and an inverted tenth bit count $\overline{f(10)}_B$ (diagram 5(g)) on a line 136. A non-inverted $\overline{f(8)}_B$ (defined as A5) is also fed to the memory 62 along path 86.

The $\overline{f(8)}_B$ pulses (on line 134) provide required receiver data enable ($\overline{\text{RDE}}$) signals to the UAR/T 34 and the $\overline{f(10)}_B$ pulses (on line 136) provide reset data available ($\overline{\text{RDA}}$) signals to the receiver error detector 70.

Because the bit counter B, 120 counts at the bit rate of 40 KHz and divides by 12, it continuously counts on the 12 bits of each byte 40. Therefore, the $f(o)_B$, $\overline{f(8)}_B$ and $\overline{f(10)}_B$ pulses occur at the zeroth, eighth and tenth bits of each word. In a similar manner, as above mentioned, the counter A 118 divides each bit into 16 parts so that the $f(7)_A$ pulse occurs near the middle of each bit of each byte.

A "divide by" 14 byte counter, counter C 144, to which the 3⅓ KHz byte rate output of the counter B 120 is fed, divides the byte rate into message blocks 50 and gaps 52, it being recalled that a message block is 12 bytes long and a gap is 2 bytes long, a combined block and gap being 14 bytes long with the last two bytes defining the gap. A binary count of the bytes is fed, along a path 146, to a gap decoder 148 and also along the path 86 to the memory 62.

Twelfth and thirteenth byte counts, $f(12)_C$ and $f(13)_C$ representing gap bytes (recalling that the first byte is defined as byte zero) are fed from the gap decoder 148 into an OR gate 150, which has a low output when either $f(12)_C$ or $f(13)_C$ is high, the presence of a gap being defined as $f(12)_C + f(13)_C$.

The frequency output of the byte counter C 144 is equal to the message block 50 plus gap 52 rate, and consequently defines that time period allocated to a given slave station 14. With this frequency output fed to a "divide by N" (nine in this case) station counter D 152, a slave station count is provided. This slave station count is binarily fed to the central processing unit (CPU) along a path 154 where it is used to allocate the slave station addresses to be encoded in the message blocks 50. As an illustration, when the CPU receives an indication that the counter D 152 is at station zero, it directs addressing of the byte zero of the next block 50 to slave station one. This is accomplished via address storage portions (not shown) of the memory 62, the memory also being connected to the CPU.

From the decoder 124 and the bit decoder 130, $f(7)_A$ and $f(0)_B$ pulses are fed to an AND gate 160 which goes high to provide an output pulse only in the presence of both $f(7)_A$ and $f(0)_B$; that is, only near the bit center ($f(7)_A$) of the first bit ($f(0)_B$) of each byte. This is referred to as $f(7)_A \cdot f(0)_B$ in diagram 5(e) which relates also to the byte pattern of diagram 5(d).

The $f(7)_A \cdot f(0)_B$ output from the AND gate 160 is fed, along with the $f(12)_C + f(13)_C$, or $\overline{\text{gap}}$ pulse, from the OR gate 150, to a NAND gate 162 to provide a data strobe ($\overline{\text{DS}}$) pulse to the UAR/T 34 during the first bit of each of the 12 message block bytes 40, but not during the two gap bytes (diagram 5(n)). That is, there is a $\overline{\text{DS}}$ pulse for each of the $f(7)_A \cdot f(0)_B$ pulses except those occuring during a $\overline{\text{gap}}$ as defined by $f(12)_C + f(13)_C$. Thus data is strobed out of the UAR/T 34 to the slave stations 14.

In another AND gate 164, the previously obtained $f(7)_A$ and $f(8)_B$ pulses are combined to provide a memory write pulse (MEMW = $f(7)_A f(8)_B$) to the memory 62. As can be seen in diagram 5(j), the MEMW pulse occurs near the bit center ($f(7)_A$) of each data bit eight ($\overline{f(8)}_B$).

Several control signals have thus been generated from the "divide by 8" counter 114 (640 KHz clock): $\overline{\text{DS}}$, $\overline{\text{RDA}}$, $\overline{\text{RDE}}$ and MEMW; also a count of the bytes, $A_0 - A_3$, fed to the memory 62 enables selection of byte data from an allocated part of the memory-data that has previously been entered into the memory by the CPU. Similarly station counting from the "divide by n" station counter D 152 informs the CPU what station is coming up for addressing.

As an illustration, as slave station zero is again coming up for addressing, the CPU causes the appropriate station address for station zero to be at the byte zero position, in the memory 62, other data to be transmitted to slave station zero is at the byte 1-11 positions. The data in byte one position may, for example, order slave station zero to display a certain reading on a display counter, the data in byte three may order a certain indicator light to be lit or non-lit, and so forth.

Data is strobed from the memory 62 through the UAR/T 34 by the $\overline{\text{DS}}$ at the desired rate, a transmission gap being created by no $\overline{\text{DS}}$ pulse during the gap bytes (13th and 14th bytes of the block 50 plus gap 52).

For receiving data, the $\overline{\text{RDE}}$ (receive data enable) signal ($f(10)_B$) occuring at the 8th bit of each byte (diagram $f(f)$) enables data to be input to the memory 62 if data is available in the UAR/T 34. A DA (data available) signal is automatically provided by the UAR/T 34 when data is received from the slave stations 14. Normally the DA signal starts at the end of the first bit of each data byte, being reset at the end of the byte by a $\overline{\text{RDA}}$ pulse ($f(10)_B$), diagram 5 (g). The purpose of selecting the RDE pulse to occur during the 8th data bit ($f(10)_B$) is to ensure that the DA signal will have been triggered if data is available. As the $\overline{\text{RDE}}$ pulse enables data to be removed from the UAR/T 34, the MEMW pulse ($f(7)_A \cdot f(8)_B$ diagram 5(j)) enables writing of such data into the memory 62. The portion of the memory 62 into which the data is written is determined by the $A_0 - A_5$ byte count from the byte counter (C) 144, a particular position being allocated for each received byte number so that the data can be properly interpreted and used by the CPU.

After enabling inputting of available data into the memory 62 by the $\overline{\text{RDE}}$ pulse, an available data reset (RDA) pulse ($f(10)_B$, diagram 5(g)) is sent to the UAR/T 34, through the error detector 70, to reset the DA line in preparation for the next data byte. Selecting the RDE pulse to occur at the tenth bit of each byte assures that the DA reset occurs after the memory input enabling signal RDE at bit 8 and before the end of the byte. The error detector 70 inhibits MEMW pulses (for example, by means of an AND gate 166) if any data error flags, automatically provided by the UAR/T 34, occur during the DA signal.

In the embodiment illustrated, the memory 62 is divided into two portions - one for storing data to be received and one for storing data to be transmitted. The $A_5$ pulse ($f(8)_B$) which occurs during the eighth bit of each byte, and during which the MEMW signal occurs, directs data coming into the memory 62 from the UAR/T 34 into the received data portion of the memory. At times other than when data is being received into the memory 62 from the UAR/T, there being no $A_5$ signal, the transmit memory portion is automatically selected for transmitting data from the memory to the UAR/T 34.

Thus, the control 60 not only controls formatting of message blocks 50 and gaps 52 for transmitting by the master station UAR/T 34, but also controls handling of incoming or return data from the slave stations 14.

Description of the Slave Station 12

Figure 6:
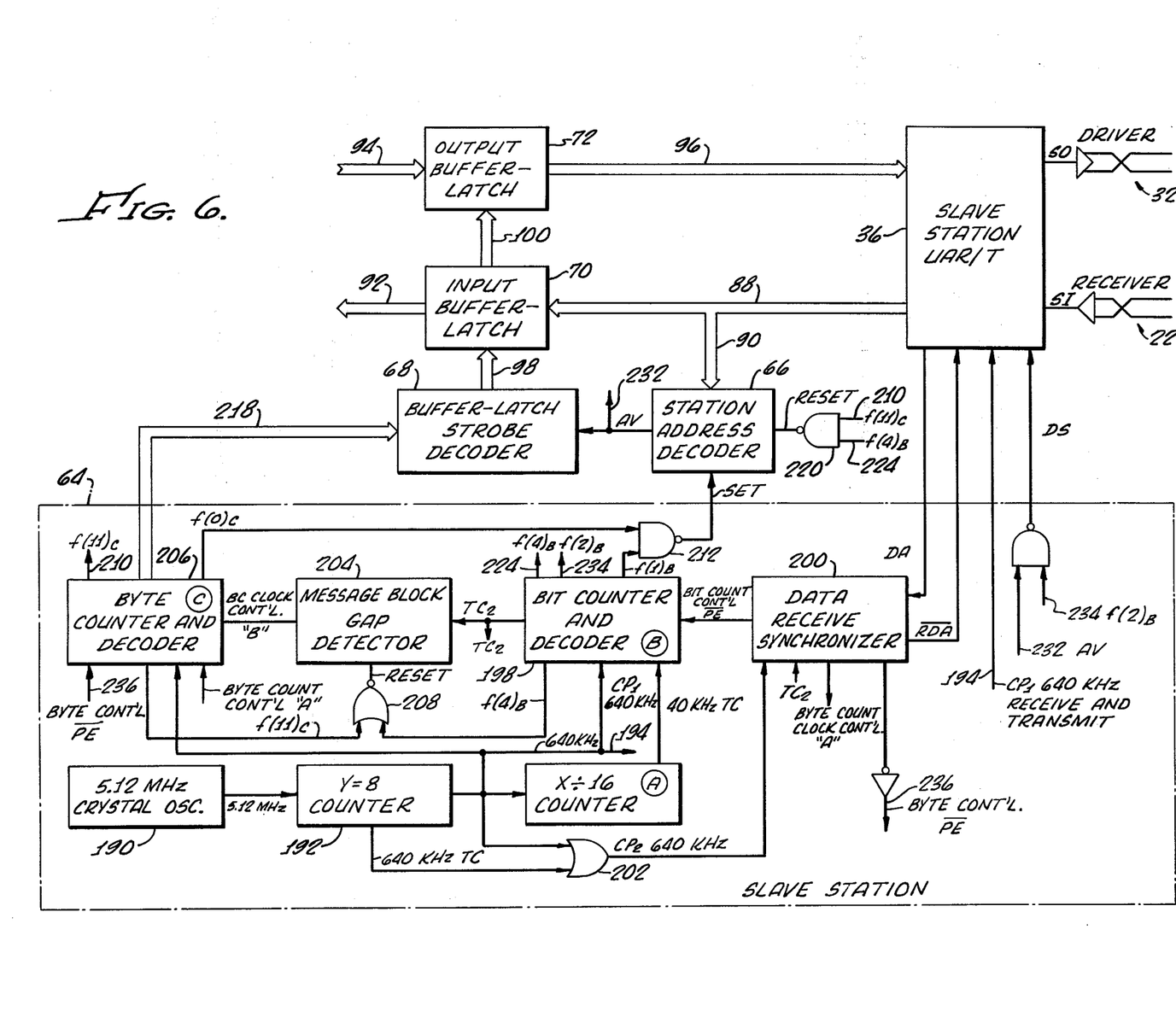
FIG. 6 is a block diagram of the typical slave station of FIG. 1, showing features thereof.
Figure 7:
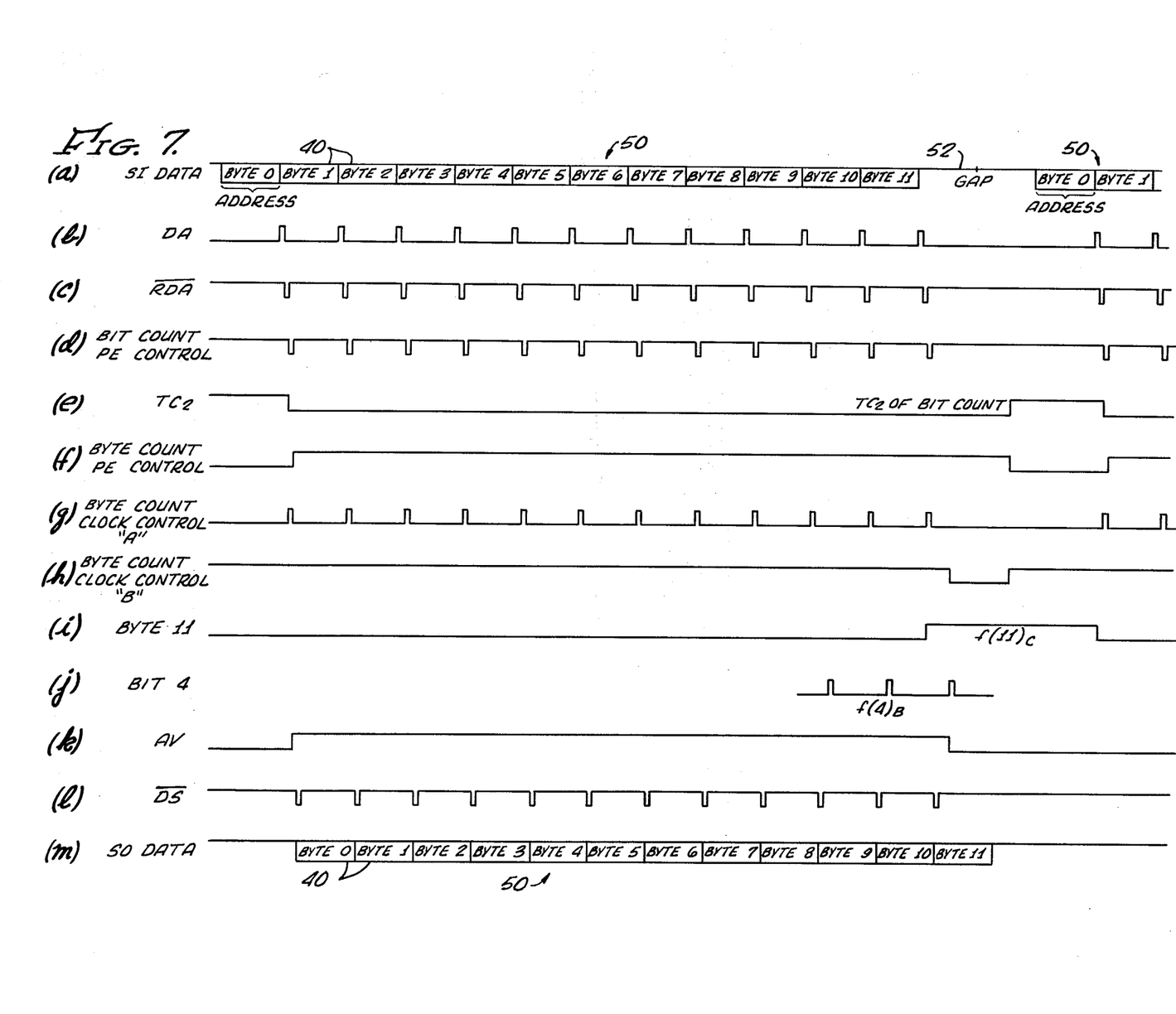
FIG. 7 (comprised of FIGS. 5a-m) is a timing diagram associated with the slave station block diagram of FIG. 6, showing various input/output characteristics of blocks thereof.

FIG. 6 shows a further breakdown of the slave station 14, particularly of the receiver clock decoder 64, at which FIG. 7 shows various pulse diagrams corresponding to input and output characteristics of functional blocks of the slave station. Taken together, FIGS. 6 and 7 enable a better understanding of the slave station 14.

Given that the master station 12 transmits message cycles 110 having a series of message blocks 50, one for each of the slave stations 14, each message block comprising 12 bytes, the first byte containing the address of the slave station to which the block is intended, and that the message blocks are separated by gaps 52 two bytes long, the slave stations are operative to recognize the presence of the gaps, to compare the message block addresses to the station address and to accept only correctly addressed message blocks. All other, incorrectly addressed message blocks 50, although still received by the slave stations 14 are ignored; that is, data from those blocks is not entered into the input buffer - latch 70.

Also, the slave stations 14 enable transmitting of data from the output buffer - latch 72 only upon receipt of a correctly addressed message block 50. If the first byte message address is found correct upon comparison with the station address, return message transmission is initiated. The transmission is then completed before the end of the gap 52 immediately following the accepted message block 50.

Each slave station 14 has a 5.12 MHz crystal oscillator 190 (FIG. 6) (corresponding to the master station oscillator 112) which feeds into a "divide by 8" counter 192 (corresponding to the master station counter 114) to provide the requisite 640 KHz clock. This 640 KHz clock is fed to the slave station UAR/T 36 along a line 194.

Also fed the 640 KHz clock from the counter 192, is a "divide by 16" counter A 196 (corresponding to the counter A 120 of the master station 12) which divides the 640 KHz input to a 40 KHz terminal count (TC) output. That is, instead of a square wave 40 KHz clock, shorter pulses corresponding to the end of each square wave pulse are provided, in a well known manner. This 40 KHz TC clock is fed to a "divide by 12" bit counter and decoder B 198, which is also fed the 640 KHz clock from the counter 192.

The bit counter and decoder 198 counts each 12 bits of each byte 40 and provides a bit one ($f(1)_B$) pulse output, a bit two ($f(2)_B$) pulse output and two bit four ($f(4)_B$) pulse outputs, as described below.

Looking at other portions of the slave station 14, all message blocks 50 and following gaps 52 are received into the UAR/T 36 on lines 22, The message block 50 and gap 52 being shown for time referencing in diagram 7(a). In response to receiving the 12 byte blocks 50, the UAR/T 36 automatically provides a data available (DA) output signal (diagram 7(b)) starting at the end of each of the 12 bytes 40 of the message block 50, but not for the two blank bytes of the gap 52. This is because, even if the data bits 44 (FIG. 2) of any message block byte 40 are all zeros, the "one" stop bits 48 are still always present. However, such is not the cause during the gap 52, the gap being formed by completely stopping transmitting of the master station UAR/T 34 for the time duration of two gap bytes. As a result, no DA output signal is provided during the gap 52.

This DA signal is fed to a data receiver synchronizer 200 which, in response thereto, generates reset data available (RDA) signals (diagram 7(c)). These RDA signals are returned to the UAR/T 36 for resetting the DA line to zero in preparation for a next DA signal at the next byte 40. Also, responsive to the RDA signals generated, the synchronizer 200 generates bit count parallel enable (PE) control signals (diagram 7(d) which are transmitted to the counter and decoder B 198. From diagrams 7(b)-(d) it is seen that the DA, RDA and bit count PE control signals have the same frequency, but are progressively offset in time by one bit. Accordingly, the bit count PE control signals start two bits after the end of each message block byte 40. For operation, the synchronizer 200 receives a slightly delayed 640 KHz Cp2 pulse formed by feeding both the 640 KHz and 640 Khz TC pulses from the counter 192 into an OR gate 202.

A purpose of the synchronizer 200 is to synchronize to the slave station, 640 KHz clock the UAR/T 36 DA signals which are timed or generated by the incoming message blocks 50, formed by the master station 640 KHz clock. The bit count PE central signals are initiated at trailing edges of the RDA signals which are in turn initiated at trailing edges of the DA signals, rather than at the leading edges, since the DA pulses leading edges are often "jittery" whereas the trailing edges are sharp.

As noted above, the station address decoder 66, via path 90, receives the first four bits data 44 of every byte 40 received by the slave station UAR/T 36, the slave station addresses being encoded into these first 4 bits, but only on the byte zero following a gap 52. Only these four data bits need be directed to the decoder 66 since only nine slave stations 14 are assumed, the 4 bits being sufficient to encode up to 16 slave station addresses in binary form.

Within the decoder 66 is a preset, assigned slave station address, comprising, again assuming nine slave stations, a four bit binary address to which the four bits from the UAR/T 36 are compared. It is essential, however, to direct the decoder 66 as to which four bit sequence from all the bytes to compare to the assigned address. Stated otherwise, the decoder must be told when byte zero, which contains encoded station addresses, is present so that the four bit byte and decoder addresses can then and only then be compared. It is to be appreciated that otherwise, normal (non address) data in the first four bits 44 of other bytes 40 would be considered address bits, and such normal data would ordinarily form an address which would be accepted by one of the slave stations 14.

Returning to the description of the counter and decoder B 198, which receives bit count $\overline{PE}$ control signals from the synchronizer 200, at the receipt of each such signal, the counter and decoder starts counting, from zero, the bits (it actually counts 40 KHz TC pulses from the counter A 196 which are at the bit rate). At each $\overline{PE}$ control pulse, the count, which normally is up to 12 since there are 12 bits per byte 40, is reset to start counting from zero again. The decoder B 198 is constructed to provide a $TC_2$ output (diagram 7(e)) which goes positive only when the decoder counter B 198 reaches a count of 16. A 16 count cannot occur during a message block 50 because the counting always is restarted at 12 by one of the bit count $\overline{PE}$ control pulses. But since there are no $\overline{PE}$ control pulses in the gap 52, the decoder B 198 is not reset after restarting at the last $\overline{PE}$ control pulse of the block 50. Consequently, the count is not restarted after 12, but continues on to 16 at which point $TC_2$ immediately goes high and remains high until reset by the first $\overline{PE}$ control pulse of the following block 50. Since that $\overline{PE}$ control pulse occurs at the end of byte zero - the address containing byte - the $TC_2$ high pulse spans part of the end of a gap 52 and the following block byte zero. This is clearly seen by comparing diagram 7(e) with diagram 7(d) and 7(a).

Also provided by the synchronizer 200 is a byte control parallel enable $(\overline{PE})$ count pulse (diagram 7(f)) which is a one bit delayed $\overline{TC_2}$ ($TC_2$ being provided to the sychronizer from the counter and decoder B 198). Use of the byte control $\overline{PE}$ count is described below.

From the bit counter and decoder B 198 the $TC_2$ signal is sent to a message block gap detector 204 which, in response thereto, provides a byte count clock control "B" signal (diagram 7(h)) to a byte counter and decoder C 206 which counts bytes from zero through 11. As can be seen in diagram 7(h), the control "B" signal goes high when $TC_2$ (diagram 7(e)) goes high The gap detector 204 is reset by a NOR gate 208 into which is fed the bit 4 ($f(4)_B$) signal (diagram 7 (i)) from the bit counter and decoder B 198 and a byte 11 count pulse ($f(11)_C$) (diagram 7(j)) from the counter and decoder C 206. In consequence, the byte count clock control "B" provides a pulse at the middle, rather than at the end of the gap 52.

Also fed into the byte counter and control C 206 is a byte count clock control "A" (diagram 7 (g)) and the byte control $\overline{DE}$ provided by the synchronizer 200. The control "A" signal being the negative of the bit count $\overline{PE}$ control signal provided by the synchronizer to the bit counter and decoder C 206 in effect counts the clock control "A" pulses, starting from a reset, zero count, when byte count $\overline{PE}$ is low. The clock control "B" signal provides such resetting, the clock control "B" pulses being seen from diagram 7 (g) representing byte 11 of one message block 50 and byte zero of the next message block. Accordingly, the counter and decoder C 206, in effect, counts message bytes zero through 11, during a message block 50 and is caused to stop counting and be reset by clock controls "A" and "B" during the gap 52, and restarts counting bytes from zero bytes of the next block.

In addition to providing a 11 count, $f(11)_c$, to the gate 208, the counter and decoder C 206 provides another $f(11)_c$ count on a line 210 as well as a byte zero count, $f(o)_c$, to a NAND gate 212 connected to the station address decoder 66. To this same NAND gate 212, a bit one count, $f(1)_B$, is supplied from the bit counter and decoder B 198. For purposes described below, the counter and decoder C 206 likewise provides a binary 12 byte count to the buffer-latch strobe decoder 68, along a path 218, so that the strobe decoder knows what byte is being counted.

It should be emphasized that all above described slave station bit and byte counting and decoding is done for all message blocks 50 and gaps 52 received by the slave station UAR/T's 36, regardless of whether or not the blocks are addressed to the slave station. It follows that the strobe decoder 68 always know what bytes and bits are being received and needs only to be activated by an accepted message block 50 to latch or strobe data into the input buffer - latch 70 from the UAR/T 36.

Activation of the strobe decoder 68 occurs when an "address verified" (AV) signal (diagram 7k) is received thereby from the address decoder 66. As mentioned, the address decoder 66 receives the first four bits 44 of each UAR/T received byte 40, but must be directed as to which of the twelve bytes should be examined for an address. This direction is provided by the NAND gate 212, which sets the address decoder when bit one of byte zero of any message block 50 is at the slave station UAR/T 36.

If, when the first four bits 44 of byte zero (address bits) are received by the station address decoder 66 and compared to the assigned address contained therein, the message block destination address corresponds to the assigned slave station address, AV goes high, thereby enabling the buffer - latch strobe decoder to input incoming message block data from the UAR/T 36 into the input buffer - latch 70 and output return message block data from the output buffer - latch into the UAR/T for transmitting. AV stays high, enabling the strobe decoder 66, until reset by a NAND gate 220 which receives the byte eleven signal ($f(11)_C$) signal on line 210 and the bit four ($f(4)_B$) signal on a line 224 connected to the counter and decoder B 198. From diagrams 7(i)-(k), it can be seen that the resetting of AV occurs in the gap 52 which follows an accepted message block 50, thereby enabling all incoming and return message blocks to be accepted and set before the strobe decoder 68 is disenabled by AV resetting. If the byte zero address does not correspond with the assigned slave station address, the AV line stops low and the strobe decoder 68 is not enabled.

Assuming that a correctly addressed message block 50 is received and the strobe decoder is enabled by a high AV signal, the decoder latches or strobes data bytes from the UAR/T into corresponding data byte locations of the input buffer - latch 70, the positions being determined by the byte count sent along the path 98. In this manner, data byte one is entered into a byte one latch position, etc. for use by the external functions which receives the data from the input buffer - latch 70 along the path 92.

There remains to be examined flow control, along the path 96 of data from the output buffer - latch 72 to the slave station UAR/T 36, such control being also provided by the strobe decoder 68, via paths 98 and 100.

The byte count provided along such paths enables the strobe decoder to address one output buffer - latch data byte position at a time.

In furtherence of return data transmitting by the UAR/T 36, a data strobe ($\overline{DS}$) signal (diagram 7(*e*)) to the UAR/T 36 enables strobing of return data through the UAR/T and to the master station 12. The $\overline{DS}$ signal is provided by a NAND gate 230 which receives the AV signal from the address decoder 66 along a line 232 and the bit two count pulse $f(2)_B$ from the counter and decoder B 198 on a line 234. A $\overline{DS}$ signal enabling return message transmission by the UAR/T 36 is thus provided only when AV is high, indicating a correctly addressed message block 50 is being received from the master station 12. Return data is strobed through the UAR/T 36, starting at a bit two count (diagram 7 (*m*)).

As seen in diagrams 7 (*a*), 7 (*l*) and 7 (*m*), transmission of byte zero return message block 50 starts at about the same time the fourth bit of byte one of an accepted message block 50 is being received, and the end of outgoing byte eleven occurs about four bits past the middle of the incoming gap 52; hence, one of the requirements for a gap being two bytes long. Bytes 40 of the return message blocks 50 are formatted by the UAR/T 36 in the same manner as incoming bytes 40 (FIG. 2) are formatted by the master station UAR/T 34.

From diagrams 7 (*b*) and 7 (*e*) for DA and $\overline{DS}$ it can also be seen that data is moved into and out of the input and output buffer - latches 70 and 72 in a slightly staggered manner, first an incoming byte, then a return byte, etc.

From the foregoing discussion, the importance of the data block 50 and gap 52 formatting, with a slave station address encoded only in the first byte (byte zero) following a gap, and the gap, and hence a message byte, identification can readily be appreciated. Once a correctly addressed first byte is received, subsequent data bytes continue to be accepted from the master station 12 without need for further byte addressing, until a gap 52 arrives, at which time the slave station 14 is reset to check the first byte of the next message block for its destination address.

Since data is sent from any slave station only during that time interval that a master station message block 50 and following gap 52 is being received by that slave station, no return data source identification is required; hence, no master station source address recognition means are required. The master station 12 needs only to keep track of which slave station 14 is being addressed; this must be already known for outgoing message addressing purposes.

It is emphasized that although the slave stations 14 have been shown and described as each having return message transmitting capabilities, this is not essential. Some or all of the slave stations 14 may be completely passive, accepting correctly addressed message blocks 50 from the master station 12 and acting on or disbursing the data contained therein, but not sending data back to the master station. In such cases, problems of transmitting data from the master station 12 to the "N" slave stations 14 in parallel remain the same and the above described data formatting by the master station is necessary whether or not any of the slave stations transmit back. If none, or only one, of the slave stations 14 transmit back, some simplifications are possible since if only one slave station 14 transmits return messages the transmission can occur at any time, provided the master station 12 knows that only a certain slave station can transmit. Any return messages, wherever sent, must obviously be from that slave station. But as soon as two or more slave stations return transmit, the above described return message transmitting schedule is required.

In the above described, each message block 50 was assumed to have been formatted with the same number of bytes 40. This fixed length enables each message block 50 to be treated alike for formatting and decoding purposes and enables, for example, only one byte counter C 144 to be used. If different amounts of data are required to be transmitted to different slave stations 14, it is generally more desirable, from a system complexity point of view, to nevertheless make all the message blocks 50 the same length, for example, the length of all message blocks being equal to the longest block necessary, "blank data" being used to fill out shorter messages. As an alternative, any stations requiring particularly longer message blocks 50, such that the just mentioned approach is impractical, can be broken down into two or more separate slave stations 14, separate message blocks 50 being sent to all the divisional slave stations. Using fixed length message blocks 50 further enabling all the slave stations 14 to be identical and interchangeable.

If however, message blocks 50 of different byte lengths are required for different stations, additional station building blocks similar to those above described can be added, such being within the scope of the invention.

Few problems are involved in not sequentially addressing the slave stations in the message cycle 110. In some systems it may be required that a master station communicate more frequently with some slave stations than others. In such circumstances, the only changes necessary are in programming of the master station CPU, since the CPU is responsible for providing the ordering of blocks 50 in the message cycle 110. Insofar as the slave stations 14 are concerned, each first byte following a gap 52 is always examined for an address, and regardless of sequence, a correctly address message block 50 is always accepted. The multiplex system 10 is, consequently, flexible in respect to changing the order of transmitting to the slave stations 14 as well as to adding or deleting slave stations.

It is further to be appreciated that the multiplex system 10 can be modified to enable using a common two way communication link rather than the above described two one way links. This can readily be accomplished by lengthening the gap 52 and delaying transmission of return message blocks from the slave stations 14 until during the gap following the end of an accepted message block. The return message block can then be transmitted during the gap on the same link or links over which the master station message blocks were transmitted. In this return message block source identification would still not be required.

And although there has been described above a specific arrangement of an asynchronous, addressable multiplex system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. An asynchronous, addressable multiplex system which comprises:
   (a) a master station having means for formatting and transmitting a series of outgoing message blocks, each block containing a number of data bytes and a destination address formatted into at least one, but not all, of the bytes, the other bytes being unaddressed, and each block being followed by an intermessage block gap, and
   (b) a plurality of slave stations, connected in parallel to the master station, each slave station having an assigned address and each including means for receiving said outgoing message blocks, and means initiated by the intermessage block gap for recognizing and decoding decoding said destination address and for accepting only those message blocks having a destination addresses corresponding to the assigned address.

2. An asynchronous, addressable multiplex system which comprises:
   (a) a master station including means for formatting and transmitting a series of outgoing message blocks, each block containing a number of bytes, a destination address being encoded into the first byte of each block, and each block being followed by an intermessage block gap and including means for receiving return message blocks, and
   (b) a plurality of slave stations connected in parallel to the master station, each slave station having an assigned address and each including means for receiving said outgoing message blocks, and means responsive to the intermessage block gap for recognizing the destination address byte and means for decoding the destination address for accepting only those blocks having destination addresses corresponding to the assigned address,
   at least some of the slave stations including means for formatting and automatically transmitting return, non-identified message blocks to the master station in response to an outgoing message block being accepted therefrom, transmitting of the return message block being completed before a next outgoing message block is transmitted by the master station.

3. An asynchronous, addressable, multiplex system which comprises:
   (a) a master station including means for formatting and transmitting a sequence of outgoing message blocks separated by intermessage block gaps, each of the message blocks having at the beginning thereof a destination address byte and including means for receiving unidentified source return message blocks, and
   (b) a plurality of slave stations, connected in parallel to the master station, each slave station having an assigned address and each including means for receiving said outgoing message blocks and means responsive to the intermessage gaps and destination address for accepting only those message blocks having a destination address corresponding to the assigned address,
   the slave stations including means for transmitting a return message block to the master station only in response to an outgoing message block being accepted therefrom, the return message block being unidentified as to source and being transmitted before the end of the intermessage gap immediately following the accepted message block.

4. An asynchronous, addressable multiplex system, which comprises:
   (a) a master station including means for formatting and transmitting a sequence of outgoing message blocks separated by intermessage gaps, each of the message blocks being formed of a plurality of fixed length bytes, the first byte of each message block containing a destination address, and the message blocks being separated by intermessage block gaps having a length equal to twice the length of said byte, and including means for receiving return message blocks,
   (b) a plurality of slave stations, each having an assigned address and each including means for receiving said outgoing message blocks and means responsive to the intermessage block gaps and destination address for accepting only those message blocks having a destination address corresponding to the assigned address,
   the slave station including means for formatting return message blocks and automatically transmitting the return message block to the master station only in response to an outgoing message block being accepted therefrom, transmitting of the return message block being initiated while an outgoing message block addressed to the station is being accepted and being completed before the end of the intermessage block gap immediately following the accepted message block, and
   (c) communications link means cooperating with the master and slave stations for enabling transmission of message blocks therebetween,
   said link means including at least one common channel linking both the master station transmitting means to all of the slave station receiving means in parallel and the master station receiving means to all of the slave station transmitting means in parallel.

5. The multiplex system according to claim 4, wherein the master station includes a first clock means for timing the formatting, transmitting and receiving means and the slave stations each include a second clock means for timing the receiving, recognizing, comparing and accepting means and return message formatting and transmitting means, said first and second clock means being independent of one another.

6. An asynchronous, addressable multiplex system, which comprises:
   (a) a master station including means for formatting a sequence of outgoing message blocks each comprising a number of fixed length bytes, the first byte of each block having encoded at the beginning thereof a destination address and each message block being separated from one another by intermessage block gaps at least two of the bytes long, means for transmitting the outgoing message blocks and means for receiving return message blocks,
   (b) a plurality of slave stations connected in parallel to the master station, each slave station having an assigned address and each including means for receiving said outgoing message blocks, means responsive to the intermessage gaps for recognizing the first byte of each message block received, for then comparing the destination address thereof with the assigned address and for accepting only those compared message blocks correctly addressed to the slave station, at least some of the slave stations also including means for formatting a sequence of return message blocks each comprising a number of bytes of said fixed length, and return message block transmitting means, the return message transmitting means causing transmitting of a return message block to the master station only in response to a correctly addressed message block being accepted therefrom, the return message block being transmitted within a time interval defined by the beginning of the accepted message block and the end of the intermessage gap therefollowing no other transmitting slave station identification being required for the return message blocks and (c) communications link means cooperating with the master and slave stations for enabling transmission of the message blocks therebetween, the link means including at least one common channel linking the master station transmitting means in parallel to all of the slave station receiving means and linking the master station receiving means in parallel to all of the slave station transmitting means.

7. An asynchronous, addressable multiplex system, which comprises:

(a) a master station which includes outgoing message formatting means, transmitting means, return message receiving means and decoding means, the formatting means including first timing means for encoding outgoing messages into a fixed length message blocks separated from one another by fixed length intermessage gaps, each of the message blocks being formatted of a plurality of fixed length bytes, only the first byte of each message block having a message destination address, the transmitting means being operative for transmitting the outgoing messages from the master station in serial form;

the first timing means being also associated with the return message receiving and decoding means, (b) a plurality of slave stations located remotely from the master station, each of the slave stations having an assigned address, and each including means for receiving all outgoing messages from the master station, responsive to said gaps for recognizing the first byte of each message block and for comparing the destination addresses thereof with the assigned address and for accepting only those message blocks having a destination address corresponding to the assigned address, the slave stations also having means for encoding and for storing before transmitting, message blocks to be returned to the master station and transmitting means for transmitting the return message blocks to the master station only in response to a message block being received therefrom, said address recognition means and said return message encoding means including second timing means for recognizing said intermessage block gaps, for accepted message blocks and for encoding and transmitting the return message blocks, said first and second timing means providing substantially identical timing pulses but being independent from one another, the transmitting means initiating transmittal of the return message between the time a message block is accepted and the end of the intermessage gap following the accepted message block, identification of return message sources being thereby enabled without other necessity for encoding a source address into the return message; and (c) means for linking the slave stations in parallel and to the master station for communication therebetween.

8. The multiplex system according to claim 7, wherein the linking means includes at least one first common channel linking the transmitting means of the master station to the receiving means of all the slave stations and at least one second common channel linking the receiving means of the master station with the transmitting means of all the slave stations.

* * * * *